United States Patent
Harrah

[15] 3,657,020
[45] Apr. 18, 1972

[54] STORAGE BATTERY COVERS
[72] Inventor: John L. Harrah, 79 West Glendale St., Bedford, Ohio 44146
[22] Filed: Apr. 10, 1970
[21] Appl. No.: 24,438

[52] U.S. Cl..............................136/170, 136/177, 136/182
[51] Int. Cl..................................H01m 1/02, H01m 1/06
[58] Field of Search..................................136/170, 177, 182

[56] References Cited

UNITED STATES PATENTS

| | | | |
|---|---|---|---|
| 2,890,262 | 6/1959 | Kendall et al. | 136/177 |
| 3,218,198 | 11/1965 | Havlick | 136/177 |
| 3,360,403 | 12/1967 | Halsall | 136/177 |
| 3,397,089 | 8/1968 | Sasagawa et al. | 136/170 |
| 3,481,793 | 12/1969 | Ihlenburg | 136/177 |

*Primary Examiner*—Donald L. Walton

[57] ABSTRACT

A cover for automotive storage batteries and more specifically to a battery cover having an integrally formed transparent panel portion to determine the electrolyte level of the batteries and having a series of open holes to allow filling the battery with electrolyte or water. The open holes each have an integral, downwardly extending tube-like portion opening into and leading to each of the battery cells. The open holes are closed with the application of a detachable air vented closure.

2 Claims, 3 Drawing Figures

PATENTED APR 18 1972 3,657,020

*INVENTOR.*
JOHN HARRAH

STORAGE BATTERY COVERS

The present invention relates broadly to automotive storage battery covers and more specifically to a cover having an integral, clear, transparent panel to determine the electrolyte level of the battery and having open cell vent holes for the purpose of filling with electrolyte or water.

The term battery as commonly used in electricity and electrochemistry refers to a device for converting chemical energy directly to electric energy. The mechanism of the process involves the arrangement of chemicals in such a manner that electrons are released in one part or electrode of the battery and caused to flow through an external circuit to the other part or electrode. Such batteries are called voltiac cells.

Included in the classification of the voltiac cells is the secondary or storage battery.

One of the most commonly used types of batteries is the lead-acid battery employed in automotive equipment. Thus, the interior mechanism of the battery comprises the cells, cell separators, cell connectors, and terminal posts.

In the present invention the exterior construction of the battery, being selected to adequately receive the said interior mechanism, consists of a container of box like formation being closed on all sides with the exception of the top surface. A cover is placed over the top surface of the container and it is sealed thereon with the use of a sealing compound.

The majority of the containers are rectangularly shaped, having two short ends and two longer sides. This invention relates to a six cell battery.

To those skilled in this particular art, it is well known that the automotive storage batteries being used at the present time have been successfully used for many years. However, the cell vent closures have never been advantageous nor staisfactory, particularly, because it has been necessary, in the majority of cases, to unscrew a single closure cap from each of the cells. Slip fit closures have also been used.

When there are batteries to be serviced on group automotive equipment it takes considerable time to remove and replace each cell vent closure. There is the possibility of losing the caps. This operation has been considerably reduced with the use of generators and Delcotrons. Even so, the electrolyte levels still must be checked.

For many years a generator was used to produce electrical current to be stored in the batteries. However, practically all of the late models of automotive equipment have an alternator, to produce electrical current. The word Delcotron is an alternator which is a product of one of the large motor manufacturing companies.

Therefore, the principal object of the present invention is to provide a battery cell cover being so constructed to possess a clear, transparent panel to allow visibility of the battery electrolyte level without removing the vent closures, and one also, to properly receive the improved cell vent closures, as disclosed in the applicant's copending patent application Ser. No. 750,910 filed Aug. 7, 1968, now abandoned.

It is also known in the art, the battery boxes, or containers, are made in many different sizes and shapes. Another object of the invention is to provide a cover that can be applicable to the diversified batteries.

During the functioning of the batteries, a certain amount of gas is generated within the cell box. In the present day automotive storage batteries the cell vent closures each have a small air hole to allow said gas to escape. Another object of the invention is to provide a second series of air holes and in this manner add additional venting means to the batteries.

Other objects and advantages of this invention will become more apparent to those skilled in the art in view of the following description, and in particular with reference to the accompanying drawings, in which the parts of the invention are designated by suitable character references in each of the views, and in which.

While the invention is shown and will be described in detail relating to a particular embodiment thereof, it is to be understood that it is not limited to such detail.

Figure 1:
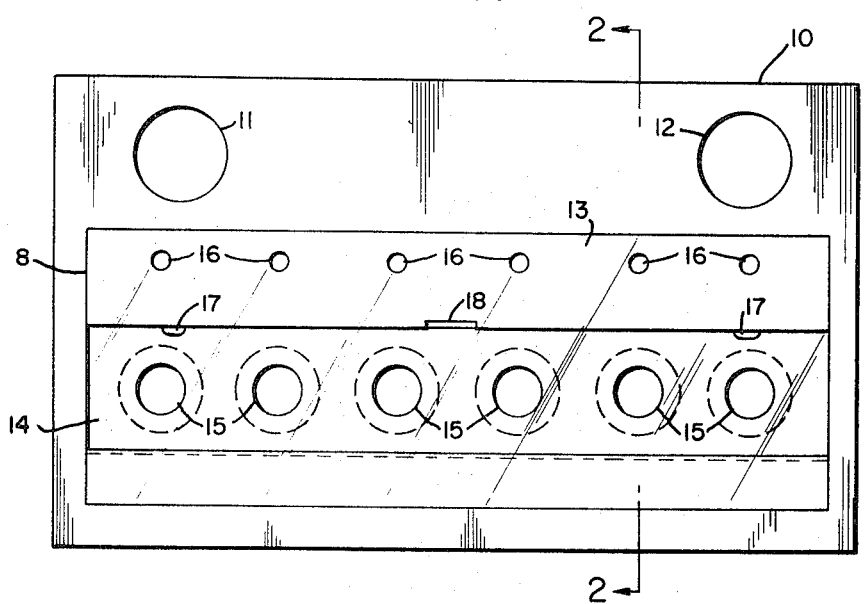
FIG. 1 is a top plan view of a taken cover.
Figure 2:
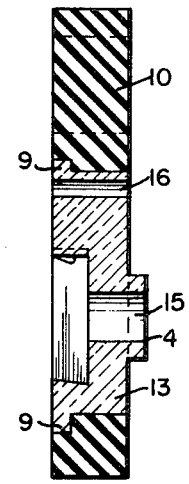
FIG. 2 is a cross sectional view of the same taken on line 2—2 of FIG. 1.
Figure 3:
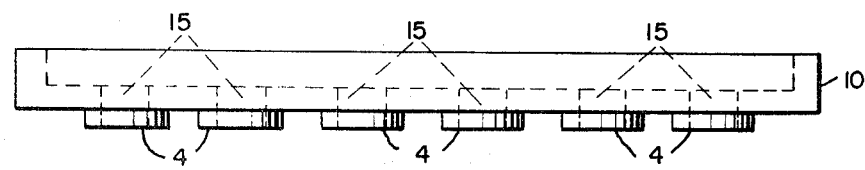
FIG. 3 is a side plan view of the cover of FIG. 1.

Referring more particularly to the drawings, it can be seen in FIG. 1, a battery cover 10 is shown. Said cover 10 is of substantially uniform thickness being of one piece formation and being appliable to the top of said battery boxes. It is prepared from an opaque composition. Said cover 10 has two recessed apertures 11–12 being provided for the purpose of receiving the positive and negative terminal posts.

Said cover 10 is possessed with an opening 8, being filled with an integrally formed clear, plastic, glass, or the like, panel 13.

The transparent panel 13 being of uniform thickness will allow determining of the battery electrolyte level without removing the cell vent closures.

The lower side of said panel 13 is possessed with a relatively shallow channel 14, extending longitudinally thereon. The bottom surface of said channel 14 is provided with a series of filling ports 15. Each of said ports 15 having a filling tube 4 opening into and leading to each of the battery cells. For the sake of brevity, the said ports 15 will hereinafter be referred to as cell vents 15. The said channel 14, possessing the cell vents 15 is so proportioned so as to receive with a close and secure fit the detachable vent closure as disclosed in applicant's said copending patent application.

The top side of said panel 13 is possessed with a series of open air holes 16.

The cell vent closure, as shown in the copending application, is also provided with a series of open air holes. The two series of air holes will in this manner provide an improved venting system to allow the said generated gases to escape from the batteries.

To securely hold the detachable closure, as disclosed in the applicant's copending closure application, within the channel 14 and to prevent accidental movement the top wall sides of said channel 14 are provided with relatively small bead like projections 17 to receive the corresponding bead like projections on the vent closure, so that in this manner, a snap lock engagement is provided.

The cover 10 as disclosed in the present application, being one of the many diversified selections, is of uniform thickness and being of somewhat rectangularly formation. The depth of the channel 14 is dependent upon the height of the vent closure. It is necessary for the panel 13 and the cell vent closure to fit flush with the top peripheral surface of the cover 10 to assure a more overall aesthetic appearance of the battery.

Said cover 10 and panel 13 are offset at 9 to insure a tighter fit of said panel within said cover.

The material of which the panel 13 is molded is preferably a compound which will assure a clear, transparent visibility at all times and one that is acid resistant.

There are various ways to interlock the cell vent closure within the channel 14. The one way of engagement as disclosed in this description is the snap lock engagement. A small screw driver slot 18 is shown in FIG. 1 for the purpose of receiving a screw driver point to disengage the closure from the channel 14.

Having thus described one embodiment of the invention what I claim as new and desire to secure by Letters Patent is:

1. A storage battery cover for a battery having a plurality of cells, caid cover comprising a material of substantially uniform thickness provided with two apertures for receiving the terminals of said battery, an opening provided trough said cover, and a panel of transparent material positioned and secured in said opening, said panel having a recessed portion providing a relatively shallow longitudinally extending channel for receiving a detachable closure member, a plurality of cell vent openings provided in said channel, and a plurality of air holes provided in said panel to provide additional means for the gases to escape from the battery cell, said transparent panel permitting visible inspection of the electrolyte in a battery.

2. An automotive storage battery having a plurality of cells in a container, a cover of uniform thickness positioned on said container, said cover being provided with two apertures through which the battery terminal posts extend, an opening provided through said cover, a panel of transparent material positioned and secured in said opening to permit visible inspection of the electrolyte in each of said cells, said panel having a recessed portion providing a relatively shallow longitudinally extending channel, a detachable closure member in said channel, a cell vent opening provided in said channel for each cell, and an air hole provided in said panel for each cell to provide additional means for the gases to escape from said cells.

* * * * *